US 7,537,166 B2

(12) United States Patent
Anson et al.

(10) Patent No.: US 7,537,166 B2
(45) Date of Patent: *May 26, 2009

(54) PORTABLE DATA READING DEVICE WITH INTEGRATED WEB SERVER FOR CONFIGURATION AND DATA EXTRACTION

(75) Inventors: Gary S. Anson, Cheshire, OR (US); Ryan R. Elliott, Eugene, OR (US)

(73) Assignee: DataLogic Mobile, Inc., Eugene, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/841,402

(22) Filed: Aug. 20, 2007

(65) Prior Publication Data

US 2007/0284443 A1    Dec. 13, 2007

Related U.S. Application Data

(63) Continuation of application No. 10/888,570, filed on Jul. 9, 2004, now Pat. No. 7,273,179.

(51) Int. Cl.
| G06K 7/10 | (2006.01) |
| G06K 7/14 | (2006.01) |
| G06F 17/00 | (2006.01) |
| G06F 19/00 | (2006.01) |
| H04Q 5/22 | (2006.01) |
| G08B 13/14 | (2006.01) |

(52) U.S. Cl. ............. 235/462.46; 235/454; 235/462.15; 235/472.02; 340/572.1; 340/10.51

(58) Field of Classification Search ............ 235/462.46, 235/454, 462.15, 472.02; 340/572.1, 10.51; 709/203, 228

See application file for complete search history.

(56) References Cited

U.S. PATENT DOCUMENTS

| 4,868,375 | A | * | 9/1989 | Blanford | ................ | 235/462.15 |
| 5,185,514 | A | * | 2/1993 | Wike et al. | .................. | 235/375 |
| 5,214,268 | A | * | 5/1993 | Doing | ................... | 235/462.15 |
| 5,382,784 | A | * | 1/1995 | Eberhardt | .............. | 235/462.46 |
| 5,727,159 | A | | 3/1998 | Kikinis | | |
| 5,837,986 | A | * | 11/1998 | Barile et al. | ........... | 235/462.01 |
| 5,965,863 | A | * | 10/1999 | Parker et al. | ........... | 235/462.25 |
| 6,321,989 | B1 | * | 11/2001 | Wilz et al. | ............. | 235/462.45 |
| 6,321,992 | B1 | * | 11/2001 | Knowles et al. | ........ | 235/462.01 |
| 6,347,743 | B2 | * | 2/2002 | Wilz et al. | ............. | 235/472.01 |
| 6,356,905 | B1 | | 3/2002 | Gershman et al. | | |
| 6,504,481 | B2 | | 1/2003 | Teller | | |
| 6,616,613 | B1 | | 9/2003 | Goodman | | |
| 6,747,692 | B2 | | 6/2004 | Patel et al. | | |
| 6,902,114 | B2 | * | 6/2005 | Hashimoto et al. | ..... | 235/462.25 |

(Continued)

*Primary Examiner*—Daniel Walsh
(74) *Attorney, Agent, or Firm*—Kory D. Christensen; Stoel Rives LLP

(57) ABSTRACT

A portable data reading device, such as a barcode scanner or RFID reader, includes a Web server and a first server-side application to modify one or more settings of the portable data reading device. The settings may include, for example, symbology settings, device settings, and network settings. The Web server may receive formatted data from a client browser representing a requested modification of at least one setting of the portable data reading device. Upon receiving the formatted data, the Web server may automatically invoke the first server-side application to modify the at least one setting responsive to the formatted data.

20 Claims, 9 Drawing Sheets

U.S. PATENT DOCUMENTS

| | | | |
|---|---|---|---|
| 7,062,763 B2 * | 6/2006 | Ali-Santosa et al. | 717/168 |
| 7,093,760 B1 * | 8/2006 | Collins, Jr. | 235/462.01 |
| 7,159,783 B2 * | 1/2007 | Walczyk et al. | 235/472.01 |
| 7,204,426 B2 * | 4/2007 | Sato et al. | 235/492 |
| 7,273,179 B2 * | 9/2007 | Anson et al. | 235/462.46 |
| 7,284,062 B2 * | 10/2007 | Krantz et al. | 709/229 |
| 7,353,995 B2 * | 4/2008 | Strickland | 235/462.01 |
| 7,398,929 B2 * | 7/2008 | Longacre et al. | 235/462.07 |
| 2001/0043273 A1 | 11/2001 | Herrod et al. | |
| 2001/0045454 A1 * | 11/2001 | Gangi | 235/380 |
| 2002/0023959 A1 * | 2/2002 | Miller et al. | 235/462.13 |
| 2002/0030105 A1 * | 3/2002 | Miller et al. | 235/462.13 |
| 2002/0130181 A1 * | 9/2002 | Reddersen et al. | 235/462.15 |
| 2002/0145045 A1 * | 10/2002 | Waxelbaum | 235/462.46 |
| 2002/0185540 A1 * | 12/2002 | Hashimoto et al. | 235/462.25 |
| 2002/0193101 A1 * | 12/2002 | McAlinden | 455/419 |
| 2002/0195495 A1 * | 12/2002 | Melick et al. | 235/462.01 |
| 2003/0022663 A1 * | 1/2003 | Rajaram et al. | 455/419 |
| 2003/0038179 A1 * | 2/2003 | Tsikos et al. | 235/454 |
| 2003/0042304 A1 * | 3/2003 | Knowles et al. | 235/384 |
| 2003/0042311 A1 * | 3/2003 | Longacre et al. | 235/462.07 |
| 2003/0069007 A1 * | 4/2003 | Rajaram et al. | 455/419 |
| 2003/0071126 A1 * | 4/2003 | Waxelbaum | 235/462.25 |
| 2003/0101233 A1 * | 5/2003 | Liou et al. | 709/218 |
| 2003/0209605 A1 * | 11/2003 | Walczyk et al. | 235/472.01 |
| 2004/0025187 A1 | 2/2004 | Cannon et al. | |
| 2004/0094627 A1 * | 5/2004 | Parker et al. | 235/472.01 |
| 2004/0103023 A1 | 5/2004 | Irwin et al. | |
| 2004/0222300 A1 * | 11/2004 | Strickland | 235/462.15 |
| 2004/0256464 A1 * | 12/2004 | Longacre et al. | 235/462.45 |
| 2004/0262395 A1 * | 12/2004 | Longacre et al. | 235/462.15 |
| 2005/0086328 A1 * | 4/2005 | Landram et al. | 709/220 |
| 2005/0199727 A1 * | 9/2005 | Schmidt et al. | 235/462.46 |
| 2005/0284943 A1 * | 12/2005 | Walczyk et al. | 235/472.01 |
| 2006/0006231 A1 * | 1/2006 | Anson et al. | 235/435 |
| 2006/0027653 A1 * | 2/2006 | Sato et al. | 235/435 |
| 2006/0106623 A1 * | 5/2006 | Lebaschi | 705/1 |
| 2006/0145855 A1 * | 7/2006 | Diorio et al. | 340/572.1 |
| 2006/0163360 A1 * | 7/2006 | Steusloff et al. | 235/472.02 |
| 2006/0223517 A1 * | 10/2006 | Rajaram et al. | 455/419 |
| 2006/0238305 A1 * | 10/2006 | Loving et al. | 340/10.1 |
| 2006/0239448 A1 * | 10/2006 | Pang et al. | 379/910 |
| 2007/0063049 A1 * | 3/2007 | Anson et al. | 235/462.46 |
| 2007/0108284 A1 * | 5/2007 | Pankow et al. | 235/454 |
| 2007/0152058 A1 * | 7/2007 | Yeakley et al. | 235/462.01 |
| 2007/0228137 A1 * | 10/2007 | Bhella et al. | 235/375 |
| 2007/0241195 A1 * | 10/2007 | Hussey et al. | 235/462.21 |
| 2007/0254711 A1 * | 11/2007 | Young et al. | 455/558 |
| 2007/0284443 A1 * | 12/2007 | Anson et al. | 235/435 |
| 2008/0093456 A1 * | 4/2008 | Pasik et al. | 235/454 |
| 2008/0121715 A1 * | 5/2008 | Field | 235/462.25 |
| 2008/0179388 A1 * | 7/2008 | Pang et al. | 235/375 |
| 2008/0209411 A1 * | 8/2008 | Koziol et al. | 717/171 |
| 2008/0230607 A1 * | 9/2008 | Etten | 235/435 |

* cited by examiner

PORTABLE DATA READING DEVICE WITH INTEGRATED WEB SERVER FOR CONFIGURATION AND DATA EXTRACTION

CROSS-REFERENCE TO RELATED APPLICATIONS

This application is a continuation of U.S. patent Ser. No. 10/888,570, filed Jul. 9, 2004, for "PORTABLE DATA READING DEVICE WITH INTEGRATED WEB SERVER FOR CONFIGURATION AND DATA EXTRACTION," which is incorporated herein by reference in its entirety.

BACKGROUND

The field of the present invention relates generally to portable data reading devices and more particularly to a portable data reader with an integrated Web server for configuration and data extraction.

Data reading devices, such as barcode scanners, RFID readers, and the like, are a popular means for data acquisition in computerized processing systems. Barcode scanners are used to optically capture barcode patterns or other symbols or information imprinted on different surfaces in order to transmit the information encoded in the barcode pattern or symbol to a host processing device.

Two major types of commonly used barcode scanners are flying spot laser scanners and image based barcode scanners. Flying spot laser barcode scanners generally obtain barcode information by sweeping a laser spot across the barcode. The laser spot may be generated from a light source inside an oscillating reflecting surface, typically a mirror. The light reflected from the barcode is collected by a photosensor, which outputs an analog waveform representing the relative spacing of the bars in the barcode. The analog signal may then be digitized and decoded into data representing the information encoded in the barcode.

Barcode scanning devices based on solid state image circuitry, such as charge coupled devices (CCDs), are also conventionally known. These types of barcode scanners are typically implemented using either a one-dimensional or two-dimensional imaging array of photosensors (or pixels) to capture the barcode. One-dimensional CCD readers capture a linear cross section of the barcode at once, producing an analog waveform whose amplitude represents the relative darkness and lightness of the barcode. Two-dimensional CCD readers capture an entire two-dimensional image at once.

A relatively new type of data reading technology is radio frequency identification (RFID). An RFID system typically employs at least two components, a "transponder" or "tag," which is attached to the physical item to be identified, and a "reader," which sends an electromagnetic signal to the transponder and then detects a response. Typically, the reader emits an RF signal which is received by the transponder after the transponder comes within an appropriate range. In response to the signal from the reader, the transponder sends a modulated RF signal sent back to the reader. The reader detects this modulated signal and can identify the transponder by decoding the modulated signal. After identifying the transponder, the reader can either store the decoded information or transmit the decoded signal to a computer.

The transponder used in an RFID system may be either "passive" or "active." A passive transponder can be a simple resonant circuit, including an inductive coil and a capacitor. Passive transponders are generally powered by the carrier signal transmitted from the reader. Active transponders, on the other hand, generally include transistors or other active circuitry, and require their own battery source.

Barcode scanners and RFID readers may be physically separate from host processing devices, such as personal computers, which provide decoding software, computer storage, and communication interfaces. Increasingly, however, barcode scanners and RFID scanners are being integrated into portable host processing devices. For instance, the Falcon® 4420 Data Collection Terminal manufactured by PSC Inc. of Eugene, Oreg., combines a laser barcode scanner, storage memory, and wireless communication interface in a compact, portable form factor. Such portable devices can be easily transported to different locations within a warehouse, retail store, or the like, greatly simplifying the tasks of receiving, inventorying, etc.

Currently, portable data readers, such as the Falcon® 4420 Data Collection Terminal, are set up and maintained using various client-side configuration programs running on remote personal computers. For instance, PSC Inc. provides a Falcon® Management Utility (FMU), which facilitates remote configuration of the Falcon® 4420 Data Collection Terminal via the device's wireless (RF) interface. Unfortunately, client-side configuration programs, such as FMU, present a number of drawbacks.

Initially, each remote computer that is to access a portable data reader must have a separate installation of FMU, which gives rise to management and maintenance issues. For instance, administrators must ensure that all computers are initially configured with FMU, and that all installations of FMU are of the correct version to be compatible with a particular data reading device.

Moreover, FMU and the like typically use synchronization programs, such as Microsoft ActiveSync®, to update the file system of the portable data reader. However, ActiveSync® and similar programs use point-to-point protocols that allow only a single connection to exist between a remote computer and a portable data reader. Thus, updating the file systems of multiple data readers must be done one at a time, which greatly increases maintenance time.

Finally, protocols used by FMU and others are not secure for use across the Internet. For example, FMU communicates with portable data readers using SNMP (simple network management protocol). However, SNMP uses specific ports in the TCP/IP stack that are vulnerable across the Internet. Competitors, hackers, or other malicious users could exploit the open architecture of SNMP to intercept data and even obtain information about other devices and computers on a company's network.

Because of security concerns, network administrators typically block all but a few ports (e.g., for HTTP, e-mail, etc.) using firewalls, preventing programs like FMU from working properly. While virtual private networks (VPNs) can be used to work around these limitations, VPNs increase the complexity and expense of a system.

Accordingly, the present inventors have recognized a need for a technique for configuring a portable data reader that does not require specialized client-side software to be installed on each personal computer that is to access the data reader. There is also a need for a technique for configuring and/or accessing multiple portable data readers at the same time. In addition, there is a need for a technique for securely configuring and/or accessing a portable data reader across a network, such as the Internet.

SUMMARY OF THE INVENTION

A portable data reading device uses an integrated Web server for various functions including device configuration, setting interrogation, data extraction, file system updates, and cloning.

DETAILED DESCRIPTION

Figure 1:
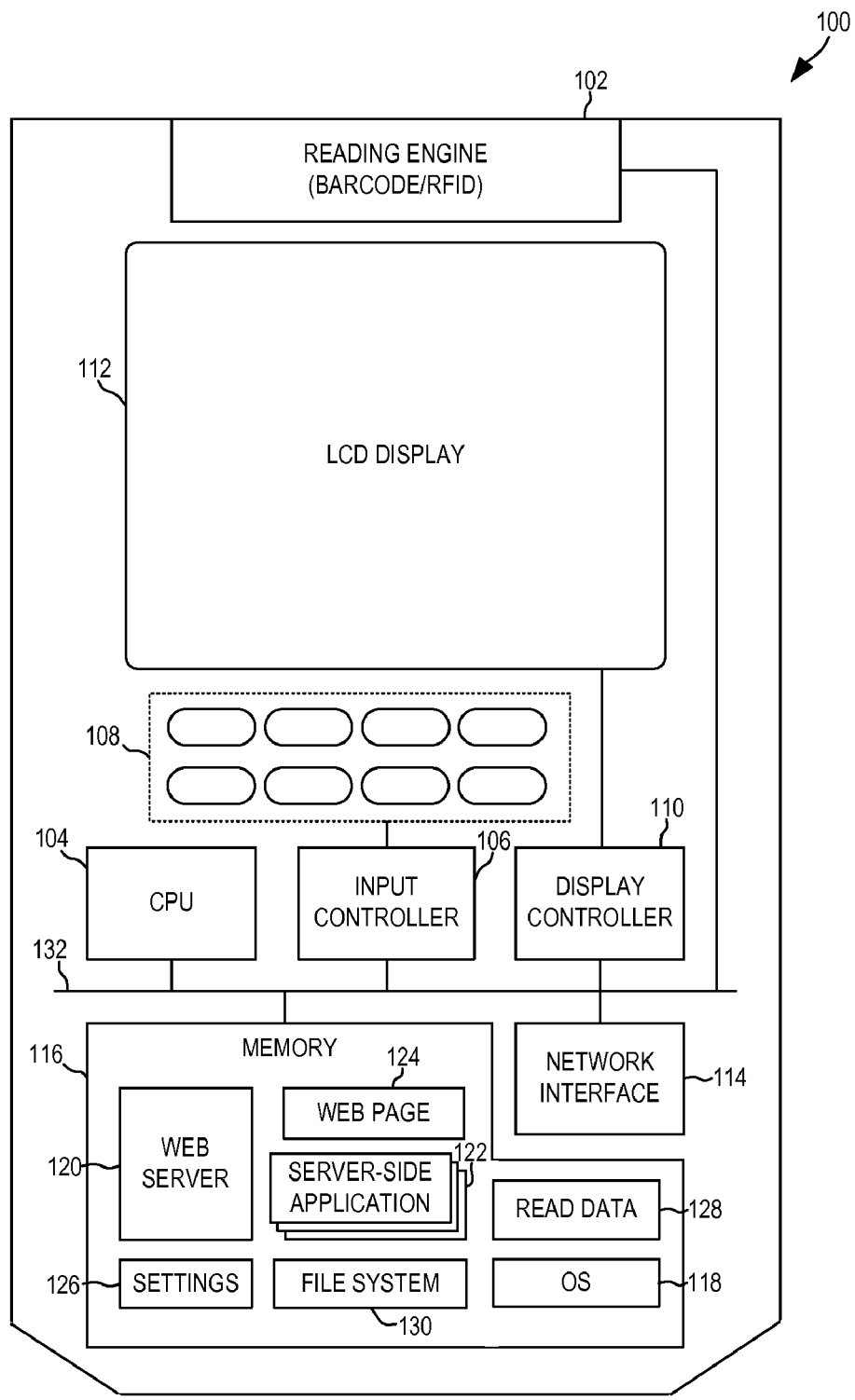
FIG. 1 is a block diagram of a portable data reader including a Web server and a number of server-side applications.

Reference is now made to the figures in which like reference numerals refer to like elements. For clarity, the first digit of a reference numeral indicates the figure number in which the corresponding element is first used.

FIG. 1 is a block diagram of portable data reader 100, such as a barcode scanner or radio frequency identification (RFID) reader. The portable data reader 100 may include a reading engine 102, such as a barcode scan engine and/or RFID reading engine. In one embodiment, the reading engine 102 reads barcode symbols from a physical object and/or information from an RFID tag.

Various reading engines 102 are known in the art. For instance, a laser barcode scan engine 102 is available from Intermec Technologies Corp. of Everett, Wash. or other manufacturers. Similarly, an RFID reading engine is available from SAT Corporation of Houston, Tex. In various other embodiments, the reading engine 102 may provide dual barcode/RFID reading. As used herein, barcode scan engines 102 may also encompass CCD-based imagers.

The portable data reader 100 may further include a central processing unit (CPU) 104, such as an Intel® XScale™ PXA255 400 MHz processor. Likewise, the portable data reader 100 may include a standard input controller 106 to receive user input from a keypad 108 or other input device and a display controller 110 to drive an integrated LCD display 112.

The portable data reader 100 may also include a network interface 114 to communicate with an external network (not shown), the network interface 114 conforming to various wired or wireless networking standards, such as IEEE 802.3 (Ethernet), IEEE 802.11 b, or Bluetooth™.

The portable data reader 100 further includes a memory 116, which may be implemented using one or more standard memory devices. The memory devices may include, for instance, RAM, ROM, and/or EEPROM devices, and may also include magnetic and/or optical storage devices, such as hard disk drives, CD-ROM drives, DVD-ROM drives, etc.

In one embodiment, the memory 116 stores various functional modules, settings, and user data. For instance, the memory 116 may include an operating system (OS) 118, such as Windows CE .NET 4.2 or the like.

As illustrated, the memory 116 may further include a Web server 120. The Web server 120 may be embodied as the HTTP daemon (HTTPD) for Windows CE .NET. However, those of skill in the art will recognize a variety of other Web servers 120 may be used, such as Apache or Microsoft Internet Information Services (IIS).

Whatever Web server 120 is chosen, it is preferably capable of executing server-side scripts and/or code written in various languages, such as Visual Basic, JavaScript, VBScript, C#, C++, or the like. As explained in greater detail below, scripts may be used, for instance, to automatically invoke one or more server-side applications 122 to perform various desirable functions, such as device configuration, setting interrogation, data extraction, file system updates, and cloning.

In one embodiment, the memory 116 may further store a number of settings 126 for the portable data reader 100. As described in greater detail below, the settings 126 may include, for instance, various symbology settings, device (e.g., user-interface) settings, and network settings.

As depicted, the memory 116 may store read data 128 (symbols and/or information read from barcodes, RFID tags, etc.) obtained by the reading engine 102. All of the foregoing may be stored within, or indexed by, a file system 130, which is typically managed by the OS 118.

The above-described components, including the reading engine 102, CPU 104, input controller 106, display controller 110, network interface 114, memory 116, and the like, may be interconnected via a bus 132. While the illustrated embodiment depicts one possible configuration of a portable data reader 100, it should be recognized that a wide variety of hardware and software configurations may be provided.

Figure 2:
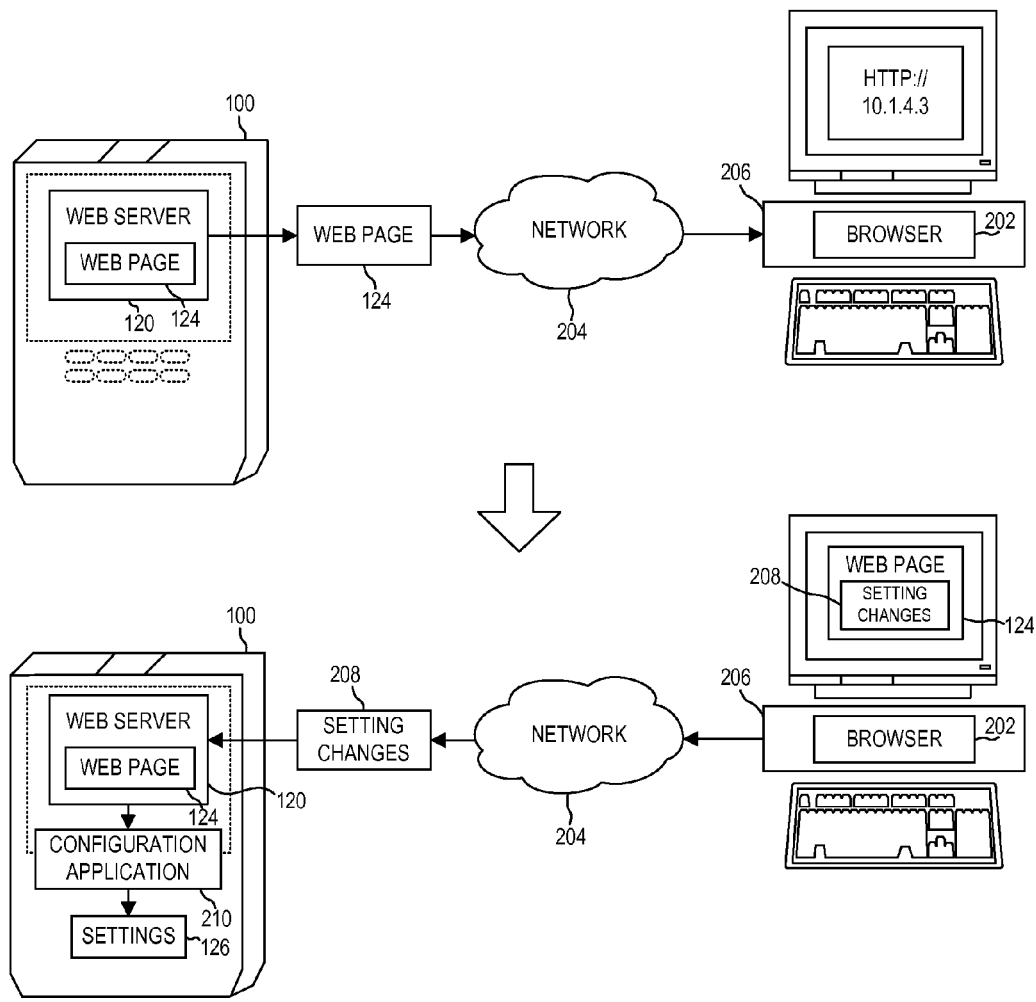
FIG. 2 is a data flow diagram illustrating a process for configuring a portable data reader.

Referring to FIG. 2, a process is shown for configuring a portable data reader 100 using an integrated Web server 120. Initially, a Web browser 202 ("browser") establishes a communication channel with the Web server 120 over a network 204. The network 204 may be embodied as a conventional local area network (LAN), wide area network (WAN), and/or the Internet.

The browser 202 may be hosted by a remote personal computer 206 connected to the network 204. In one embodiment, the browser 202 may comprise a conventional program for retrieving and displaying documents encoded in a markup language, such as the hypertext markup language (HTML) or extensible markup language (XML). For instance, the browser 202 may be embodied as Microsoft Internet Explorer. The communication channel is established using conventional protocols, such as the hypertext transfer protocol (HTTP), in response to a user providing a uniform resource locator (URL), Internet protocol (IP) address, or other suitable identifier of the Web server 120 to the browser 202.

Once a connection is established, the Web server 120 may serve (i.e., deliver) a Web page 124 to the browser 202 listing various settings 126 of the portable data reader 100 that can be modified by the user. As previously noted, the settings 126 may include, for instance, symbology settings, device settings, and network settings, as illustrated in the exemplary Web pages 124a-c of FIGS. 3A-C, respectively.

Figure 3A:
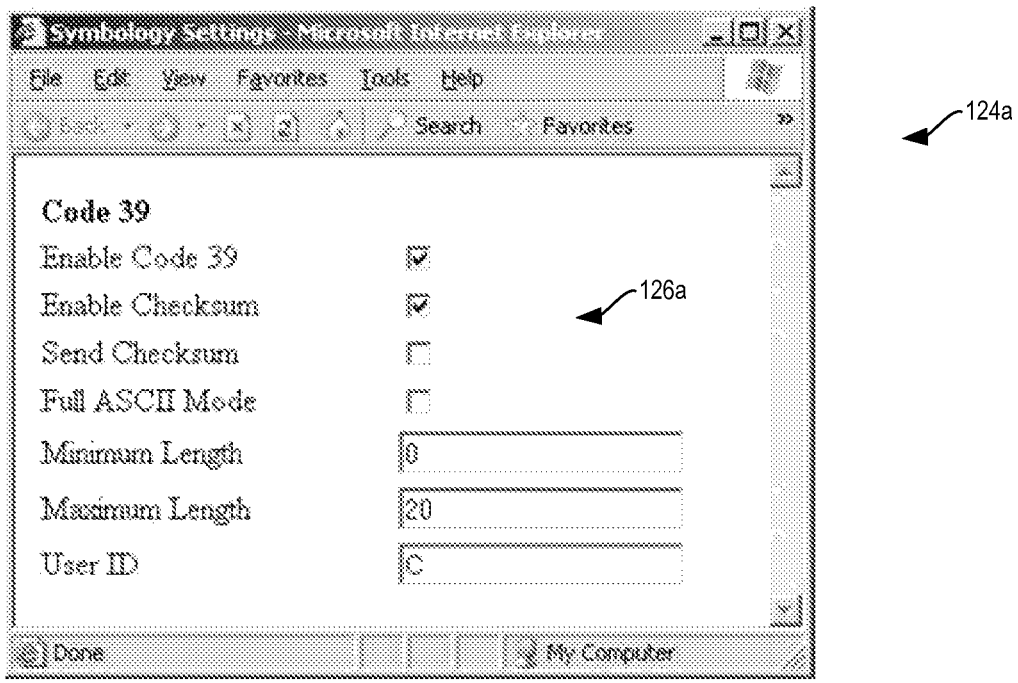
FIG. 3A is an exemplary Web page for modifying symbology settings.

Referring to FIG. 3A, a first Web page 124a may allow a user to specify changes to symbology settings 126a, e.g., which symbology types the data reader 100 is enabled to read/decode. In the context of barcode scanning, symbologies are effectively barcode "languages." Different symbologies provide different tradeoffs in terms of the size of the symbol set, the encoding density, the readability of the symbols, etc. Various symbologies are known in the art. For example, one-dimensional (1D) barcode symbologies may include Code 128, Code 29, Interleaved 2 of 5, Universal Product Code (UPC), Extended Code 39, Code 93, UCC 128, Codabar, EAN/JAN, MSI, Zip+4, DPBC POSTNET. Examples of two-dimensional (2D) symbologies include PDF 417, DataMatrix Code, and MaxCode.

As illustrated, the Web page 124a of FIG. 3A may allow a user to enable or disable various symbologies, as well as configure various symbology-related settings, such as minimum length, maximum length, trioptic settings, etc. The particular settings 126a available within the Web page 124a will depend, of course, on the specific reading engine 102 being used.

Figure 3B:
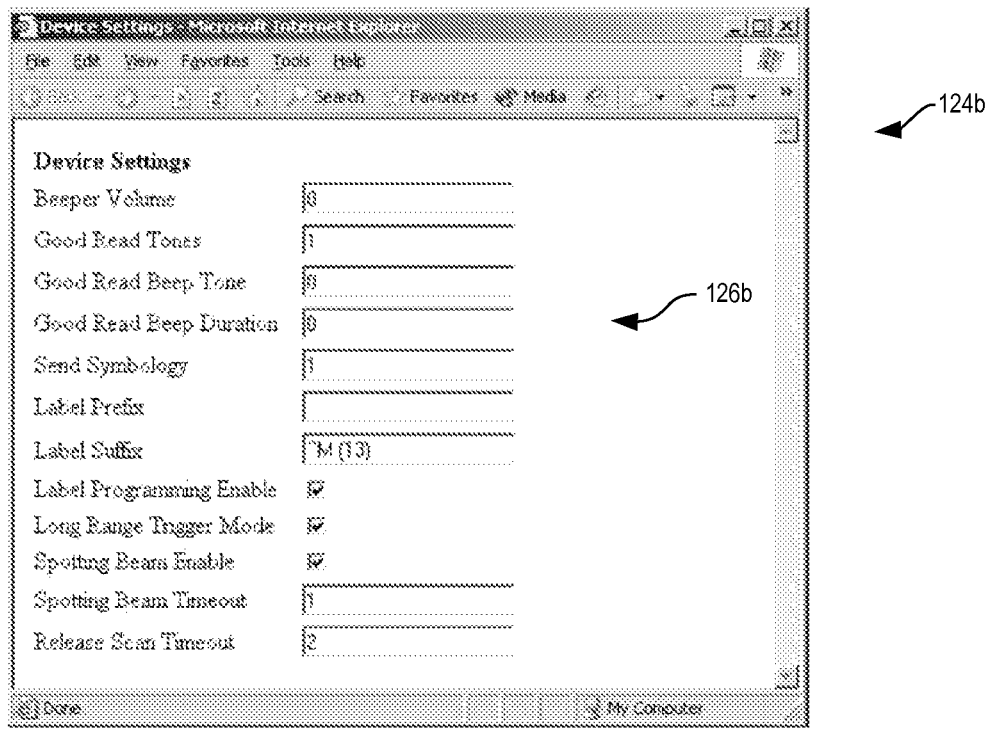
FIG. 3B is an exemplary Web page for modifying device settings.

As shown in FIG. 3B, a second Web page 124b may allow a user to specify various device settings 126b, such as user interface settings or other data reading functions. As illustrated, such settings may include, for instance, the beeper volume, the number of good read tones, label prefixes, label suffixes, whether the spotting beam should be enabled, the spotting beam timeout, etc. Again, the available settings 126b will vary depending on the particular reading engine 102 and portable data reader 100.

Figure 3C:
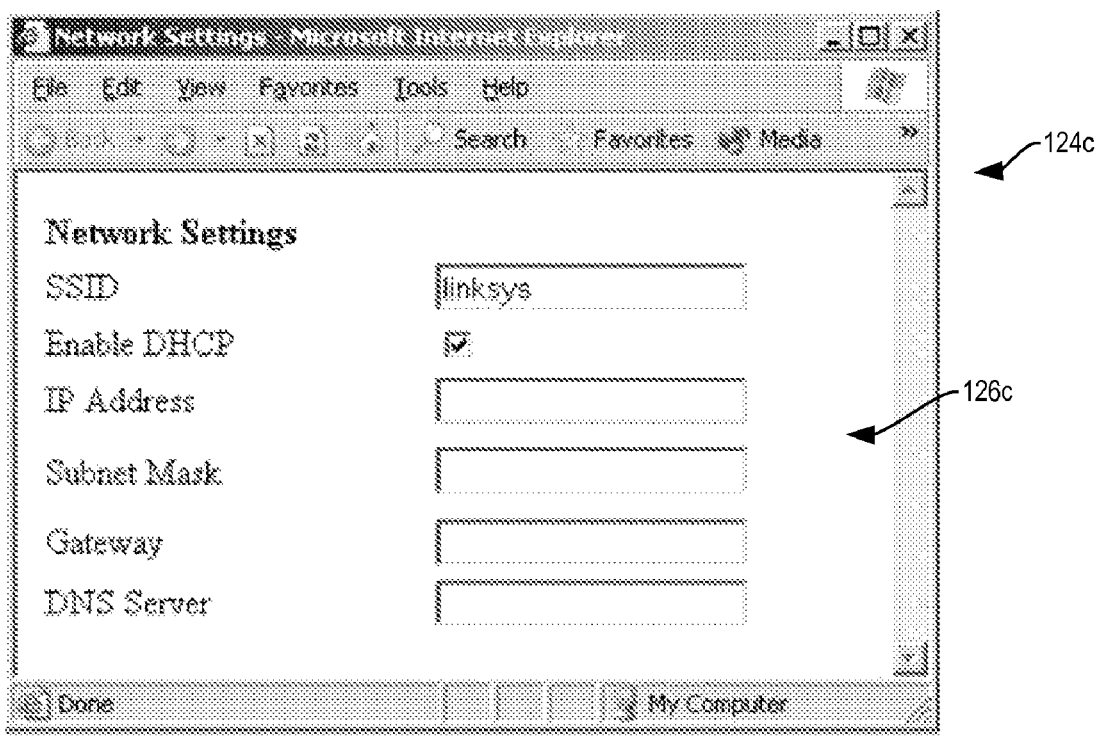
FIG. 3C is an exemplary Web page for modifying network settings.

Referring to FIG. 3C, a Web page 124c may allow a user to specify various settings 126c for the network interface 114 of FIG. 1. Possible network settings 126c according to one embodiment of the invention are provided below in Table 1.

TABLE 1

| Network Settings | Description | Action |
|---|---|---|
| Service Set Identifier (SSID) | A sequence of characters that uniquely names a wireless local area network (WLAN). Allows workstations to connect to the network when multiple independent networks operate in the same physical area. | Type in value. |
| Enable DHCP | Automates configuring of computers using TCP/IP. | Check to enable. |
| IP Address | Network address of a computer on a network. | Type in value. |
| Subnet Mask | Number used to identify a subnetwork so an IP address can be shared on a Local Area Network (LAN). | Type in value. |
| Gateway | System (bridge) for exchanging information across networks. | Type in value. |
| DNS Server | Domain Name Server aka Domain Name Service, server that resolves IP addresses from host names. | Type in value. |

Referring again to FIG. 2, the user may specify one or more setting changes 208 within the Web page 124. For instance, the user may choose to enable the Code 39 symbology. In one implementation, the browser 202 in conjunction with the Web page 124 formats the requested setting changes 208 into HTML or another suitable format for transmission to the Web server 120 over the network 204.

In the depicted embodiment, setting changes 208 are passed as parameters on the URL address line. For example, symbology setting changes 208 may be formatted as follows:

http://<terminal IP>/SymSet?<command> where the <command> is formatted as shown in Table 2.

TABLE 2

| <command> | Meaning |
|---|---|
| C39EN = 0, 1 | Code 39 Enable: 0 = Disabled, 1 = Enabled |
| C39CDE = 0, 1 | Code 39 Check Digit Enable: 0 = Disabled, 1 = Enabled |
| C39CDS = 0, 1 | Code 39 Send Check Digit: 0 = Disabled, 1 = Enabled |
| CD39MIN = 0x1, 0x22 | Code 39 Minimum Length: 0x1 = length of 1, 0x22 = length of 22 hex (50 decimal) |
| CD39MAX = 0x1, 0x22 | Code 39 Maximum Length: 0x1 = length of 1, 0x22 = length of 22 hex (50 decimal) |

Thus, to enable Code 39 and the Code 39 check digit, the following setting URL may be constructed:

http://<terminal IP>/SymSet?C39EN=1&C39CDC=1

In the foregoing example, the identifier "SymSet" may be associated with a particular server-side application 122, i.e., a configuration application 210. Upon receiving the setting changes 208, the Web server 120 automatically invokes the configuration application 210 to make the requested changes 208 to the symbology settings 126a of the portable data reader 100. In one embodiment, the configuration application 210 may be automatically invoked using scripts (e.g., VBScript) or other server-side code.

Various techniques may be used to ensure that setting changes 208 sent over the network 204 remain secure. For instance, security protocols, such as SSL (Secure Sockets Layer) and HTTPS (HyperText Transfer Protocol Secure), may be used. In addition, authentication information, such as passwords, tokens, or the like, may be required to access the Web server 120.

Unlike conventional approaches, the above-described technique for configuring a portable data reader 100 is not limited to single connections via a synchronization program, such as ActiveSync®. The multithreaded nature of browsers 202 permit multiple portable data readers 100 to be configured at the same time. Furthermore, any number of portable data readers 100 may be configured with only a few mouse clicks on the remote personal computer 206 anywhere in the world where an Internet connection is available.

Figure 4:
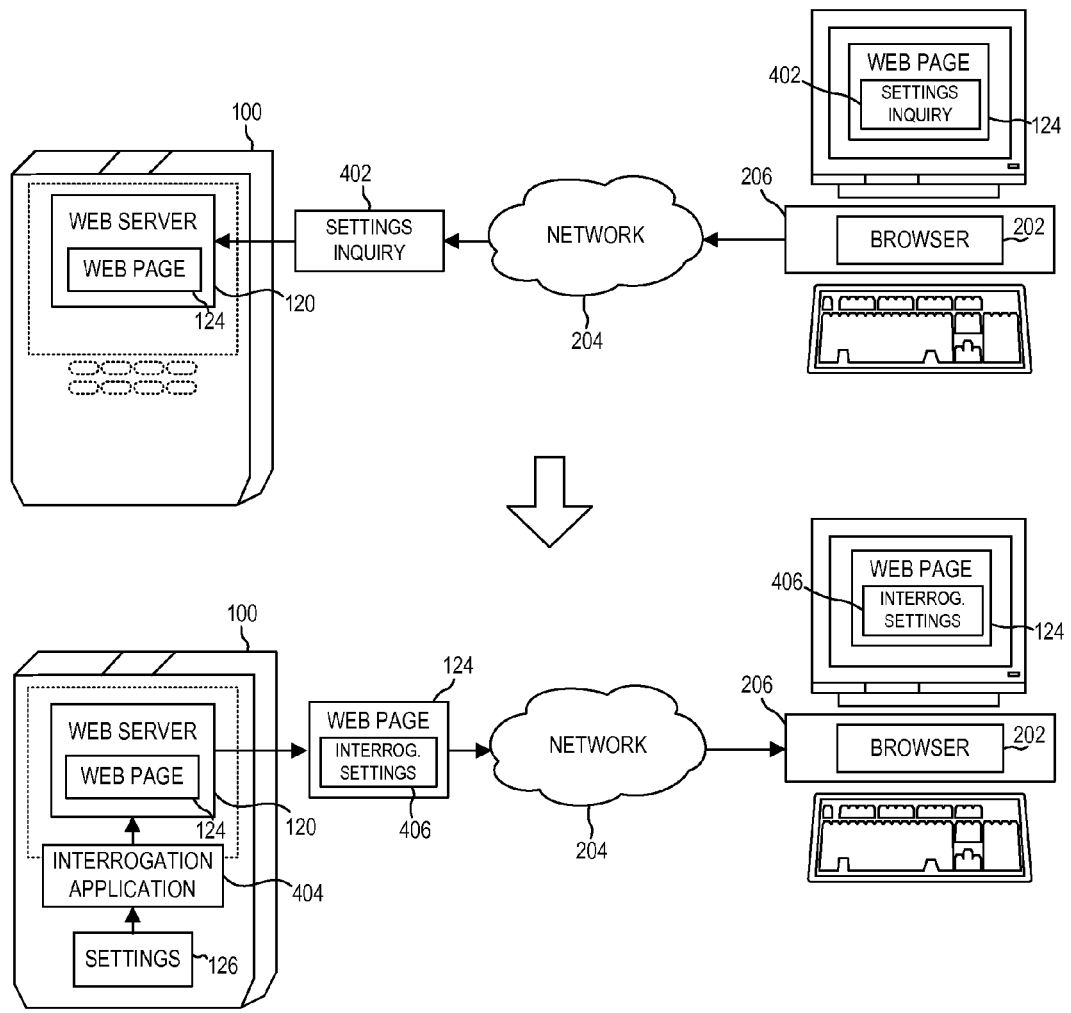
FIG. 4 is a data flow diagram illustrating a process for interrogating settings of a portable data reader.

Referring to FIG. 4, a process is shown for interrogating (i.e., reading and reporting) one or more settings 126 of a portable data reader 100 using an integrated Web server 120. Initially, the browser 202 establishes a communication channel with the Web server 120 as described with reference to FIG. 2. Thereafter, using the Web page 124, the user specifies the desired settings 126 within the portable data reader 100 to interrogate. The Web page 124 may help the user formulate a settings inquiry 402 to be transmitted through the network 204 to the Web server 120.

In one implementation, a settings inquiry 402 is formatted in HTML as follows:

http://<terminal IP>/SymGet?<setting> where <setting> specifies the desired settings 126 or a string that can be matched with one or more settings 126. For instance, a user may desire to interrogate settings 126 related to Code 39. In this case, the settings inquiry 402 may be composed as http://<terminal IP>/SymGet?C39. In one embodiment, the identifier "C39" will be matched against any setting 126 having a name that begins with "C39."

In response to the settings inquiry 402, the Web server 120 automatically invokes a particular server-side application 122, i.e., an interrogation application 404. As in the case of the configuration application 210, the interrogation application 404 may be automatically invoked using scripts or other server-side code. When invoked, the interrogation application 402 interrogates the specified settings 126 of the portable data reader 100 and provides one or more interrogated settings 406 to the Web server 120. For clarity of description, different server-side applications 122 are assigned to different functions, e.g., configuration and setting interrogation. However, a single server-side application 122 supporting multiple functions could also be used.

In one embodiment, the Web server 120 formats the interrogated settings 126 into a Web page 124. The Web page 124 produced in response to the above settings inquiry 402 may be formatted as follows:

```
<HTML>
<HEAD>
PSC Falcon Web Interface
</HEAD>
<BODY>
Code39 Enable = 1
Code39 Check Digit Enable = 1
</BODY>
</HTML>
```

Of course, the Web page 124 may be formatted in other ways. After creating the Web page 124, the Web server 120 transmits the Web page 124 including the interrogated settings 406 to the browser 202 for display.

Figure 5:
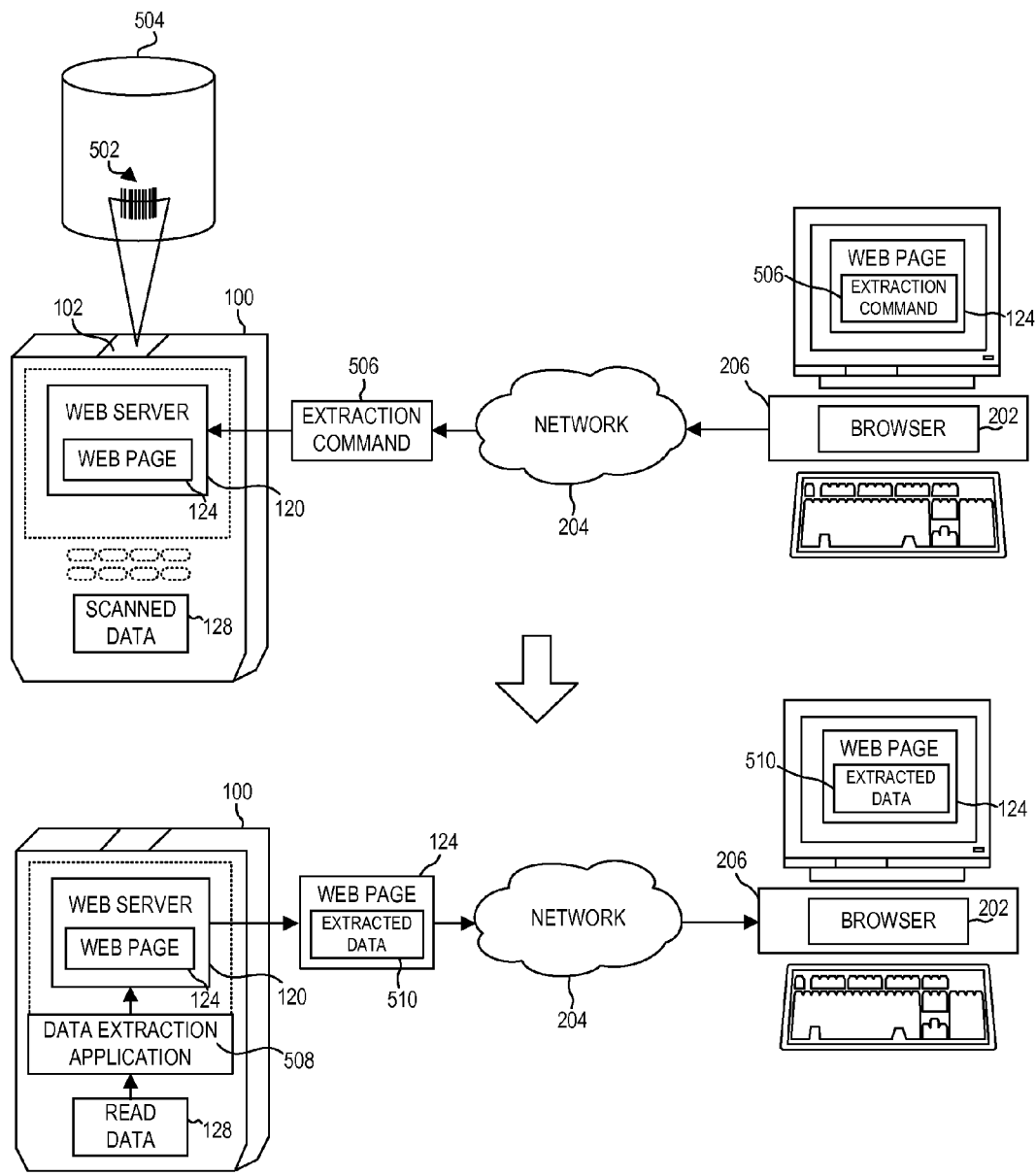
FIG. 5 is a data flow diagram illustrating a process for extracting read data from a portable data reader.

Referring to FIG. 5, a process is shown for extracting read data 128 from a portable data reader 100 using an integrated Web server 120. As explained above, the reading engine 102 within a portable data reader 100 may read symbols 502 (such as barcodes) from physical objects 504. The symbols 502 may be stored as read data 128 within the portable data reader 100.

Initially, the browser 202 establishes a communication channel with the Web server 120 as described with reference to FIG. 2. Thereafter, the user may employ a Web page 124 retrieved from the Web server 120 to compose an extraction command 506. The extraction command 506 may be formatted in HTML, although the precise formatting is not crucial. In one embodiment, the extraction command 506 requests all read data 128 stored by the portable data reader 100. Alternatively, the extraction command requests some subset of the read data 128, e.g., a date or time range.

The browser 202 transmits the extraction command 506 to the Web server 120 via the network 204. In response, the Web server 120 automatically invokes a particular server-side application 122, i.e., a data extraction application 508. The data extraction application 508 reads the read data 128 or subset thereof and provides extracted data 510 to the Web server 120.

In one embodiment, the Web server 120 formats the extracted data 510 into a Web page 124, which is then sent to the browser 202 for display. The particular formatting of the extracted data 510 will vary depending on the type of reading engine 102. For instance, the extracted data 510 may include a list of scanned symbols with an indication of the date and time at which each symbol was scanned. Alternatively, the extracted data 510 may comprise various types of information read from RFID tags.

Figure 6:
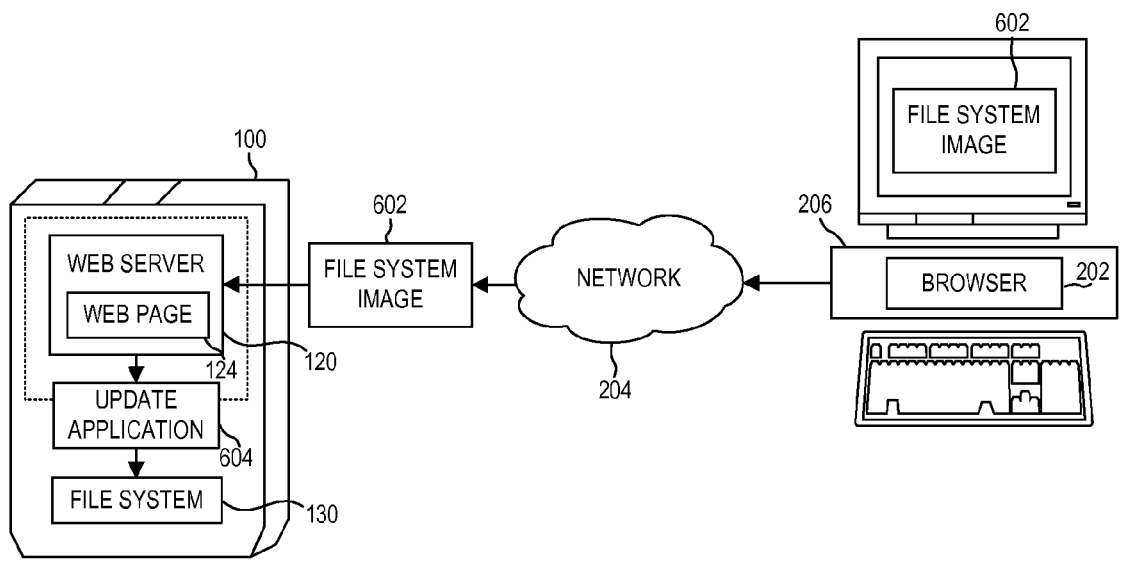
FIG. 6 is a data flow diagram illustrating a process for updating a file system of a portable data reader.

Referring to FIG. 6, a process is shown for updating a file system 130 of a portable data reader 100. As explained above, the memory 116 of the portable data reader 100 may include a file system 130, which may be used to store, among other things, the OS 118, settings 126, Web server 120, server-side applications 122, Web page 124, and the like.

In certain instances, it may be desirable to remotely deploy or update a file system 130 of one or more portable data readers 100. Installing individual applications on a portable data reader 100 is time consuming. The problem is compounded when dealing with multiple readers 100.

As illustrated, a file system image 602 containing all or a subset of the data within the file system 130 of a portable data reader 100 may be stored within a personal computer 206. The file system image 602 may be created using various available or custom-designed utilities running on the portable data reader 100 and/or the personal computer 206. Examples of available utilities for creating fie system images 602 include Windows CE NET Platform Builder, available from Microsoft, Norton Ghost™ 2003, available from Symantec™, and Sprite Clone™, available from Sprite Software™. In other embodiments, an image backup utility packaged with the OS 118 may be used.

The file system image 602 or a link thereto may be provided to the browser 202, which formats the file system image 602 for transmission to the Web server 120 over the network 204. In one embodiment, upon receiving a file system image 602, the Web server 120 automatically invokes a particular server-side application 122, i.e., an update application 604, to replace the file system 130 (or portion thereof) of the portable data reader 100 with the file system represented within the file system image 602. In certain configurations, the update application 604 may be embodied as an image restoration utility packaged with the OS 118. In other embodiments, a commercially-available or custom-designed utility may be used for this purpose.

The above-described technique may be used to completely reconfigure the portable data reader 100, even replacing the OS 118, changing all or part of the settings 126, providing new or different server-side applications 122, etc. For instance, the portable data reader 100 may be switched between inventory, shipping, and receiving applications with a simple click of the mouse button on the personal computer 206.

Figure 7:
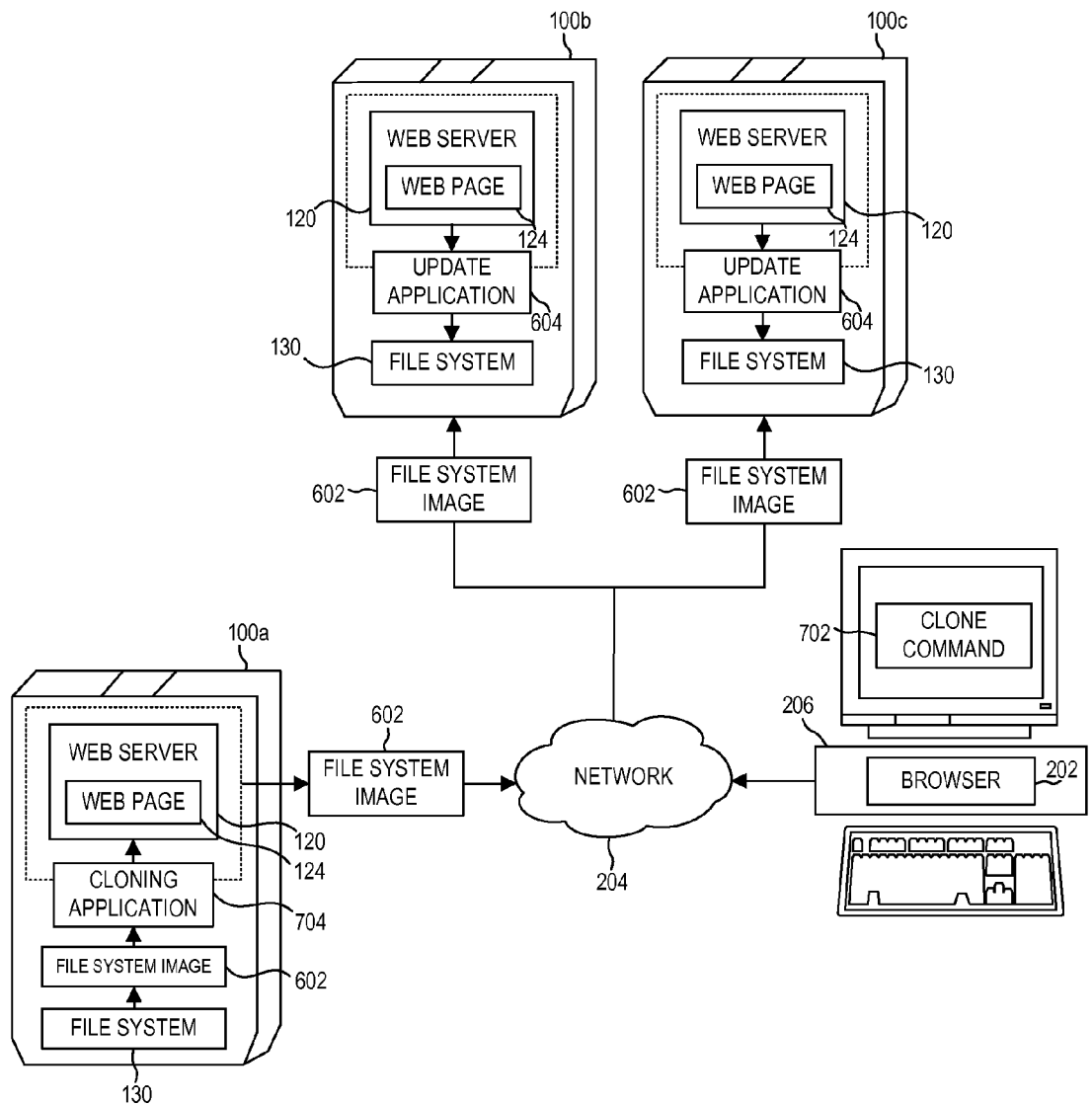
FIG. 7 is a data flow diagram illustrating a process for cloning a file system of one portable data reader to one or more other portable data readers.

FIG. 7 illustrates a related process of cloning a file system image 602 of one portable data reader 100 to one or more other portable data readers 100. Cloning may be performed with or without the intervention of a remote personal computer 206. For example, the browser 202 may send a clone command 702 to a Web server 120 within a first portable data reader 100a. In response, the Web server 120 may automatically invoke a particular server-side application 122, i.e., a cloning application 704, which creates an image 602 of the file system 130 of the portable data reader 100a.

The cloning application 704 provides the created file system image 602 to the Web server 120, which formats the file system image 602 for transmission over the network 204 to Web servers 120 in two other portable data readers 100b-c. The specific portable data readers 100b-c to receive the file system images 602 may be indicated within the clone command 702. In certain embodiments, the transmitted images 602 may be accompanied by instructions to cause the receiving portable data readers 100b-c to update their file systems 130.

When respective Web servers 120 of the portable data readers 100b-c receive the file system images 602, the Web servers 120 may automatically invoke update applications 604, as described with reference to FIG. 6, which replace the file systems 130 of each portable data reader 100 with that of the file system images 602. Thus, with a single command sent over a network 204, such as the Internet, a user may clone the file system 130 of one portable data reader 100a to any number of other portable data readers 100, saving significant time over conventional approaches.

In an alternative embodiment, the remote personal computer 206 may not be used. Instead, a user of the first portable data reader 100 may use local browser 202 (not shown) to access the Web server 120 and invoke a clone command 702. In such an embodiment, the user may specify, for example, which other portable data readers 100 are to receive copies of the file system image 602.

In addition to the configuration application 210, interrogation application 404, data extraction application 508, update application 604, and cloning application 704, various other server-side applications 122 may be included. For instance, server-side applications 122 may be provided for one or more of the following purposes:

file transfers
remote application launch
remote method invocation
distributed computing among peers
redundant data paths for file transfers and OS updates
remote registry setting
messaging
reporting, system level and system statistics.

Figure 8:
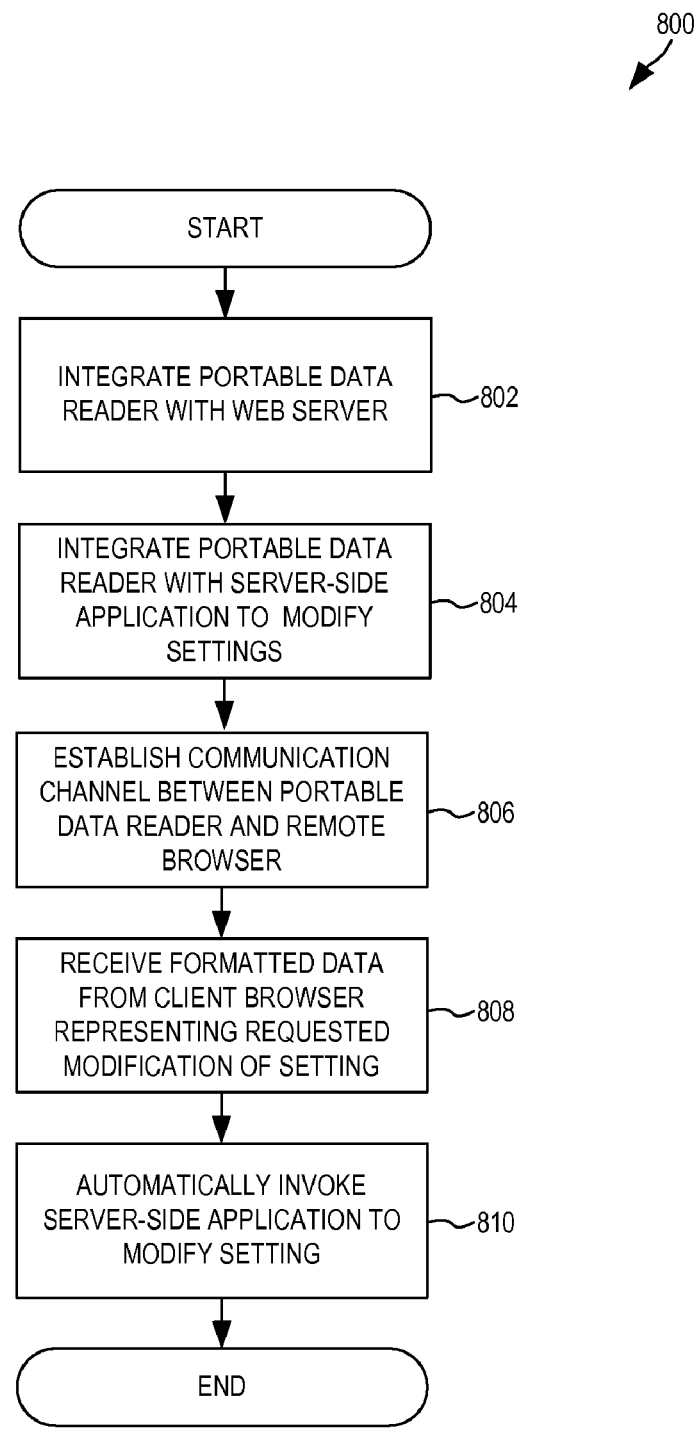
FIG. 8 is a flowchart of a method for configuring a portable data reader using an integrated Web server.

Referring to FIG. 8, a flowchart is shown of a method 800 for configuring one or more settings 126 of a portable data reader 100. Initially, a user, administrator, or manufacturer integrates 802 a Web server 120 with the portable data reader 100, as described with reference to FIG. 1. The Web server 120 may be embodied, for instance, as a standard Windows CE-based Web server 120, such as HTTPD or the like.

In addition, the user, administrator, or manufacturer integrates 804 a server-side application 122 with the portable data reader 100 for modifying scanner settings 126. In one embodiment, the sever-side application 122 may be invoked using server-side scripts or other code within a Web page 124 served by the Web server 120 to a browser 202 within a remote personal computer 206.

To change a setting 126, the user/operator establishes 806 a communication channel between the portable data reader 100 and the browser 202 over a network 204, such as the Internet. Typically, a connection is accomplished in response to the user typing a URL for the desired portable data reader 100 into the browser 202. Once a communication channel is established, the user/operator causes the browser 202 to send formatted data representing requested setting changes 208 for the portable data reader 100, which are subsequently received 808 by the Web server 120. In response, the Web server 120 automatically invokes 810 the server-side application 122 to modify the settings 126 of the portable data reader 100 consistent with the requested setting changes 208.

Those of skill in the art will recognize that similar methods may be employed with respect to setting interrogation, data extraction, file system updating, cloning, and other features that can be implemented using server-side applications.

While specific embodiments and applications of the present invention have been illustrated and described, it is to be understood that the invention is not limited to the precise configuration and components disclosed herein. Various modifications, changes, and variations apparent to those of skill in the art may be made in the arrangement, operation, and details of the methods and systems disclosed herein without departing.

Embodiments may include various steps, which may be represented as machine-executable instructions to be executed by a general-purpose or special-purpose computer (or other electronic device). Alternatively, the steps may be performed by hardware components that contain specific logic for performing the steps, or by any combination of hardware, software, and/or firmware.

Embodiments may also be provided as a computer program product including a machine-readable medium having stored thereon instructions that may be used to program a computer (or other electronic device) to perform processes described herein. The machine-readable medium may include, but is not limited to, floppy diskettes, optical disks, CD-ROMs, DVD-ROMs, ROMs, RAMs, EPROMs, EEPROMs, magnetic or optical cards, or other type of media/machine-readable medium suitable for storing electronic instructions.

What is claimed is:

1. A method for modifying one or more settings of a portable data reader, the method comprising:
   providing a portable data reader including an integrated Web server to deliver Web pages to a client browser in response to a request from the client browser, wherein the client browser is hosted on a remote computer;
   providing for receiving at the Web server formatted data from the client browser representing a requested modification of at least one setting of the portable data reader;
   providing for automatically invoking a first server-side application to modify the at least one setting in response to receiving the formatted data; and wherein the portable data reader is one of an RFID reader or an optical information reader.

2. The method of claim 1, further comprising:
   providing for automatically invoking a second server-side application to interrogate at least one specified setting of the portable data reader; and
   providing for sending formatted data representing at least one interrogated setting to the client browser.

3. The method of claim 1, further comprising:
   providing for automatically invoking a second server-side application to extract read data from the portable data reader; and
   providing for sending the extracted data to the client browser.

4. The method of claim 1, further comprising delivering to the client browser a Web page comprising code to automatically invoke the first server-side application to modify the at least one setting.

5. The method of claim 1, wherein the portable scanning device comprises a barcode scan engine to read one or more symbols from a physical object.

6. The method of claim 5, wherein the one or more settings comprise symbology settings for the barcode scan engine.

7. The method of claim 1, wherein the portable scanning device comprises an RFID reading engine to read information from an RFID tag.

8. The method of claim 1, wherein the one or more settings comprise user interface settings for the portable data reading device.

9. The method of claim 1, wherein the one or more settings comprise network settings for a communication interface.

10. The method of claim 4, wherein the Web page comprises a server-side page, and wherein the code comprises an embedded script.

11. A method comprising:
- integrating a portable data reader with a Web server to deliver Web pages to a client browser in response to a request from the client browser, wherein the client browser is hosted on a remote computer;
- integrating the portable data reader with a first server-side application to modify one or more settings of the portable data reader;
- receiving formatted data at the Web server from the client browser representing a requested modification of at least one setting of the portable data reader;
- automatically invoking the first server-side application to modify the at least one setting responsive to the formatted data; and wherein the portable data reader is one of an RFID reader or an optical information reader.

12. The method of claim 11, further comprising integrating the portable data reader with a barcode scan engine to read one or more symbols from a physical object.

13. The method of claim 12, wherein integrating the portable data reader with a first server-side application comprises integrating the portable data reader with a first server-side application in which the one or more settings comprise symbology settings for the barcode scan engine.

14. The method of claim 11, further comprising integrating the portable data reader with an RFID reading engine to read information from an RFID tag.

15. The method of claim 11, wherein integrating the portable data reader with a first server-side application comprises integrating the portable data reader with a first server-side application in which the one or more settings comprise user interface settings for the portable data reader.

16. The method of claim 11, further comprising integrating the portable data reader with a communication interface to communicate with the client browser through a network.

17. The method of claim 16, wherein integrating the portable data reader with a first server-side application comprises integrating the portable data reader with a first server-side application in which the one or more settings comprise network settings for the communication interface.

18. The method of claim 11, further comprising integrating the portable data reader with a Web page comprising code to cause the Web server to automatically invoke the first server-side application to modify the at least one setting.

19. The method of claim 18, wherein integrating the portable data reader with a Web page comprises integrating the portable data reader with an server-side page in which the code comprises an embedded script.

20. A computer-readable medium comprising program instructions for performing a method for configuring a portable data reader including a Web server and a first server-side application for modifying one or more settings of the portable data reader, the method comprising:
- establishing a communication session with the portable data reader by providing a Uniform Resource Locator (URL) of the Web server to a client browser, wherein the client browser is hosted on a remote computer;
- sending formatted data from the client browser to the Web server comprising a requested modification of at least one setting of the portable data reader, wherein the formatted data is configured to cause the Web server to automatically invoke the first server-side application to modify the at least one setting of the portable data reader; and wherein the portable data reader is one of an RFID reader or an optical information reader.

* * * * *